United States Patent

[11] 3,575,008

| [72] | Inventor | John W. Lorenz |
| | | La Crosse, Wis. |
| [21] | Appl. No. | 833,357 |
| [22] | Filed | June 16, 1969 |
| [45] | Patented | Apr. 13, 1971 |
| [73] | Assignee | The Trane Company |
| | | La Crosse, Wis. |

[54] STEAM STARTUP STABILIZER FOR AN ABSORPTION REFRIGERATION MACHINE
13 Claims, 2 Drawing Figs.

[52] U.S. Cl. ............................................... 62/103,
62/148, 62/476
[51] Int. Cl. ........................................... F25b 15/06
[50] Field of Search ........................................... 62/148,
103, 104, 476

[56] References Cited
UNITED STATES PATENTS

| 2,049,664 | 8/1936 | Rinaman | 62/148X |
| 3,005,318 | 10/1961 | Miner | 62/141 |
| 3,195,318 | 7/1965 | Miner | 62/148 |

*Primary Examiner*—Meyer Perlin
*Assistant Examiner*—P. D. Ferguson
*Attorneys*—Lee E. Johnson, Arthur O. Andersen and Carl M. Lewis

ABSTRACT: A control for cold starting absorption refrigeration machines first preheats the absorption solution and the machine mass, then switches over to conventional demand and normal control. The preoperational preheat cycle utilizes a preselected, usually constant, rate of heat input into the generator of the machine. The preoperational cycle is completed when the absorption solution in the absorber reaches a preselected temperature.

Patented April 13, 1971

3,575,008

INVENTOR.
JOHN W. LORENZ

BY *Lee Johnson*

ATTORNEY

STEAM STARTUP STABILIZER FOR AN ABSORPTION REFRIGERATION MACHINE

BACKGROUND OF THE INVENTION

When an absorption machine is started in a warm building, that is, when the absorption machine itself is not heated up to operating temperature, a large heat demand occurs. Heat is usually supplied by condensing steam. A sudden demand for steam lowers the supply boiler pressure to such an extent that the boiler may shut down through its safety controls.

A conventional demand limiter control arrangement is usually sufficient to overcome this steam demand (inrush) problem on some installations; however, in many applications the boiler size is more critical. In these cases, if the valve opening controlled by a demand limiter is opened wide enough to match or exceed boiler output, the absorption unit will not produce enough refrigerant to satisfy the demand. The machine will, therefore, automatically shut down responsive to overriding safety controls, or if no such control, the refrigerant pump could seize. It is to be noted that much of the "inrush" steam is required to initially heat the absorption unit's metal and solution mass to near the operating temperature.

It is, therefore, desirable to provide a control system which would first meter the amount of steam to the absorption machine generator during an initial cold start which would nearly match the safe output of the boiler or heat supply source. Secondly, it is desirable to cause the boiler to fully "fire up" so that a sufficient steam supply would be available for the normal refrigeration cycle of the unit. Thirdly, it is desirable to decrystallize any partially crystallized absorption solution in the refrigeration machine.

SUMMARY OF THE INVENTION

This invention therefore provides an absorption refrigeration machine including an absorber having an heat exchange means therein for cooling absorption solution, an evaporator in fluid communication with said absorber having an heat exchange means therein for chilling a heat transfer fluid, a condenser having an heat exchange means therein for condensing refrigerant, a generator having an heat exchange means for supplying heat to an absorption solution therein, means for circulating absorption solution from the absorber to the generator and from the generator to the absorber, an improvement in controlling the absorption refrigeration machine comprising a control means capable of providing a control signal responsive to a first condition initiating a preoperational cycle of the machine, a second condition indicating completion of the preoperational cycle, a third condition derived from the demand for refrigeration on the machine, and a heat control means for varying the heat supply to the heat exchange means in the generator, the heat control means responsive to the control signal, the first condition relating a predetermined rate of flow of heat through the heat control means during the preoperational cycle, the second condition causing the third condition to override the first condition, thereafter the third condition functionally relating the heat supply to the demand.

The method for cold starting the absorption machine comprises initially supplying a heating fluid to the generator at a predetermined rate to heat the absorption solution and the machine, circulating absorption solution between the generator and the absorber, after the machine and the absorption solution reaches a predetermined temperature, supplying heating fluid to the generator at a variable rate responsive to refrigeration demand on the machine.

DESCRIPTION OF THE PREFERRED EMBODIMENTS

Figure 1:
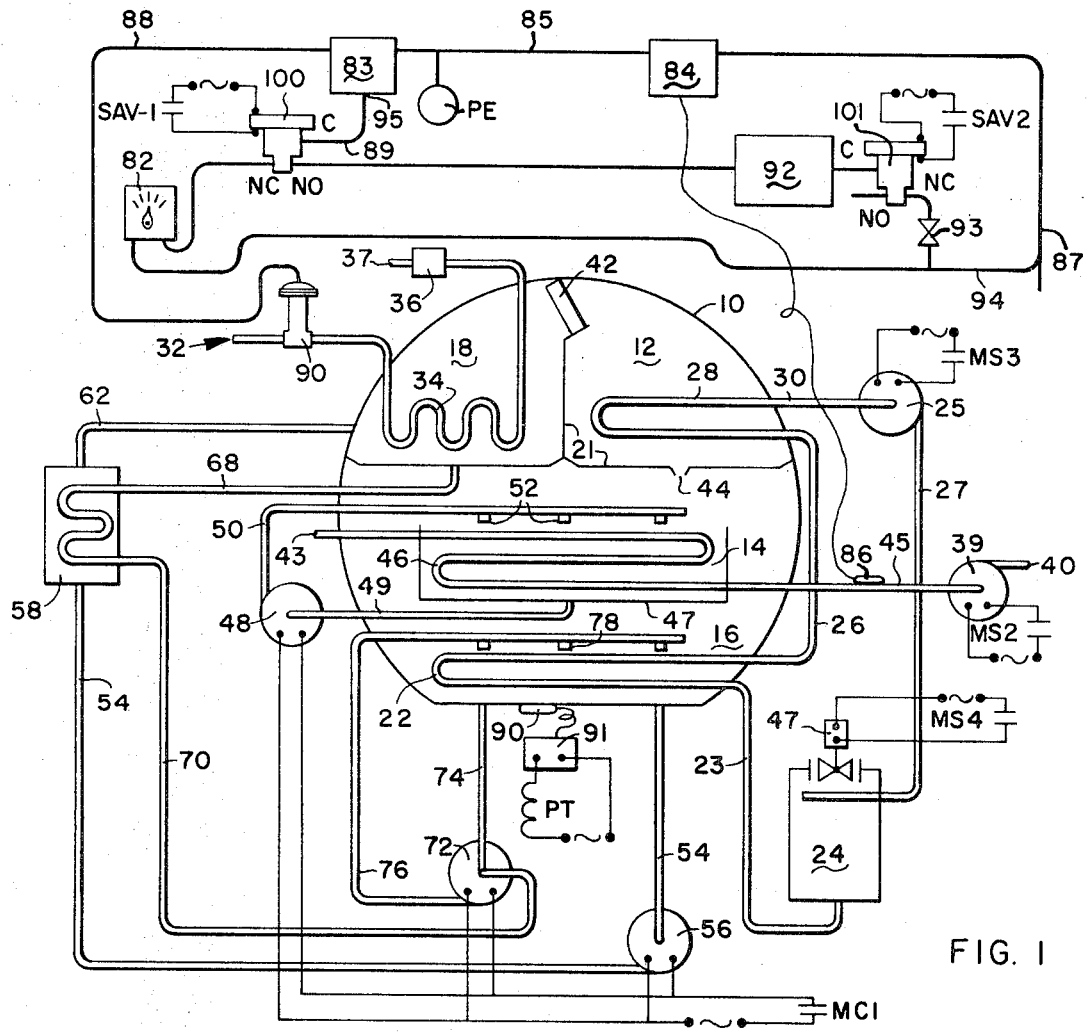
FIG. 1 is a schematic illustration of an absorption refrigeration machine showing a preferred embodiment of the control system of the instant invention.

Referring to FIG. 1, an absorption machine enclosed by fluid tight shell 10 contains a condenser 12, an evaporator 14, an absorber 16, and a generator 18. The absorber 16 contains a heat exchanger 22 supplied with cooling fluid through a conduit 23 from a cooling tower 24 to remove heat from the absorber. This cooling fluid is conducted by a conduit 26 to a heat exchanger 28 in condenser 12. The cooling fluid leaves the condenser through conduit 30 and enters pump 25. Pump 25 returns the cooling fluid from the condenser to the cooling tower through conduit 27.

Various types of refrigerants and absorbents may be used in the present machine. A solution of lithium bromide absorbent in a refrigerant such as water is satisfactory. Other suitable absorbents and refrigerants may be used if desired. The term "concentrated solution" as used herein means a solution which is concentrated in absorbent. A "dilute solution" is one which is dilute in absorbent.

Steam flows from a source 32, such as a boiler, to a heat exchanger 34 in the generator 18. Heat exchanger 34 terminates in a restrictor means 36. The restrictor means 36 can be any suitable steam flow restrictor such as an orifice or a float valve. Heat from condensing steam in the heat exchanger 34 causes dilute absorbent solution in the generator to boil. Since restrictor 36 allows substantially no steam to pass from the heat exchanger 34 condensate collects at the restrictor and flows back to the steam source through conduit 37.

The refrigerant vapor generated in the generator 18 flows through a liquid eliminator 42 into the condenser 12, in which the refrigerant is condensed to a liquid by heat exchange with the cooled fluid in heat exchanger 28. The condenser is substantially enclosed by a wall 21. The liquid refrigerant flows from the condenser through orifice 44 into the evaporator 14.

The refrigerant liquid is vaporized in evaporator 14, thus removing heat from a chilled fluid being circulated through heat exchanger 46. The chilled fluid enters shell 10 through a conduit 43 and leaves through conduit 45 into pump 39. Pump 39 circulates the chilled fluid to the heat load through conduit 40.

Since absorber section 16 is in vapor communication with the evaporator 14 the absorbent solution can absorb refrigerant vapor from the evaporator and thus remove heat from the evaporator section. Refrigerant liquid dropping from the heat exchanger 46 is collected by pan 47. It flows from the pan through a conduit 49 to a pump 48 which delivers the refrigerant liquid through conduit 50 to be sprayed in evaporator 14 through nozzles 52.

Solution from the absorber 16 flows through conduit 54, pump 56, heat exchanger 58, and conduit 62 to the generator 18 in which it is concentrated. The concentrated solution from the generator 18 flows through conduit 68 into the heat exchanger 58, in which it transfers heat to the weak solution flowing from conduit 54. From the heat exchanger 58 the concentrated solution flows through conduit 70 to pump 72 at which point is mixes with dilute solution flowing from absorber 16 through conduit 74. The mixed solution is forced by pump 72 through conduit 76 and is discharged into the absorber 16 through spray nozzles 78. It is to be understood that all pumps are driven by suitable motors which for simplicity have been shown integral with the pumps.

Figure 2:
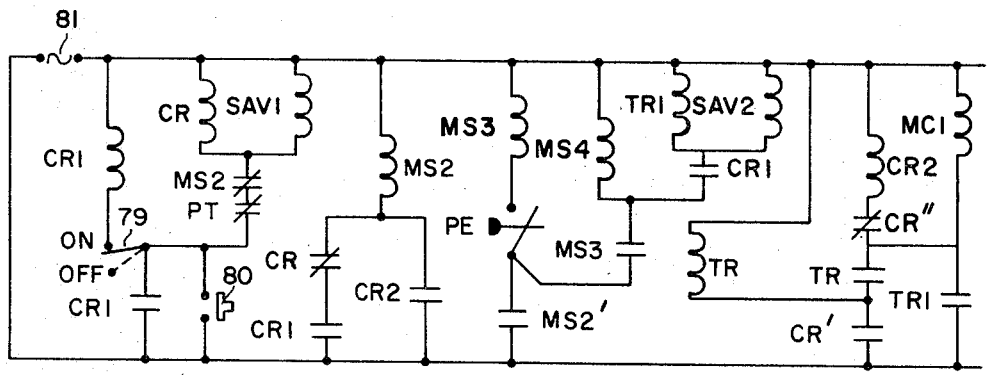
FIG. 2 is a schematic diagram of the electrical circuitry associated with the control system shown in FIG. 1.

A specific control arrangement embodied in the line diagram of FIG. 2 will be explained in conjunction with the pneumatic control system of FIG. 1. Manually activating the start button 80 will feed power from the source 81 through the normally closed contacts of the preheat termination controller PT and through the normally closed contacts of the chilled water pump magnetic starter interlock MS2 to energize a first solenoid air valve coil SAV1 and a control relay coil CR. Upon start, the switch 79 will be in the "on" position. When start button 80 is depressed, power will be sent to relay coil CR1 which will close normally open relay contacts CR1, CR1' and CR1". Coil CR1 will therefore have power sent to it through now closed contacts CR1 until the machine is shut down by placing switch 79 in the "off" position.

Energizing coil SAV1 will cause solenoid air valve 100 to shift its ports which are normally closed (NC) and normally open (NO) to respectively opened and closed positions. Air from a gradual switch 82, which has been preset to a predetermined pressure, will pass through the port NC through the open common port C to a pilot port in a one-to-one ratio cumulator 83. It is assumed, of course, that the absorption refrigeration machine is being started because there is a demand for refrigeration. This demand is sensed by measuring the temperature of the chilled water leaving the machine through sensing element 86. Thermostat 84, receiving control pressure from a source 87, transmits a signal responsive to the sensed temperature through line 85 to the cumulator 83 and to a pressure responsive electric switching means PE. The contacts of switch PE (in FIG. 2) close upon receiving a pressure signal through line 85.

The cumulator 83 transmits a pressure signal through line 88 which is responsive to the signal received from line 85; however, the signal transmitted through line 88 is limited by the signal received from the gradual switch 82 through the now open port NC of valve 100 through a common line 89. A steam valve 90 is placed in the inlet line to heat exchanger 34. The valve 90 can be a steam valve of the modulating type, the valve opening of which is functionally responsive to the pressure signal received through line 88. The gradual switch 82 is set to a pressure which will match the opening of valve 90 to the maximum steam output of the boiler or steam source 32.

As the start button 80 is closed the coil of relay CR1 will cause the normally open contacts of CR1 to close. Since the contacts of the relays MS2 and PT are normally closed power will also flow to the coil of relay CR causing the normally closed contacts of relay CR to open, thus preventing the chilled water pump starter relay coil MS2 from being energized.

Since the coil of starter MS2 is not energized the normally open contacts MS2', which are in series with the condenser water pump and cooling tower fan starters MS3 and MS4, will allow no power to be fed to the coils MS3 and MS4. Likewise, no power will be fed to the relay coils TR1 and SAV2 so that they will remain deenergized. This results in prevention of the normal startup cycle of the absorption refrigeration machine.

The control relay coil CR has a second set of normally open contacts CR' in series with the timed contacts TR of a pulse timer, a set of normally closed contacts CR", and the holding coil of control relay CR2. When coil CR is energized power is fed to the holding coil TR of the timed relay. The timed relay TR pulses on and off, for example every minute, thus closing and opening the normally open contacts TR of the relay. When the contacts TR are closed power will be fed to the starting coil MC1 for the unit pumps. When coil MC1 is energized, the normally open contacts MC1 (in FIG. 1) will start pumps 48, 56, and 72. As a result absorption solution will circulate from the absorber to the generator and back to the absorber. When the contacts TR are open the unit pumps, of course, will not be in operation. This arrangement allows heating of all the absorption solution the machine and will also heat the metal mass of the machine.

The normally closed contacts of CR" prevent relay coil CR2 from being energized, preventing energization of starting coil MS2 to start the chilled water pump during the preheat period. Because the coil TR1 of a second timer is not energized, its contacts remain open during the preheat period. Relay TR1 may also be set to open at a predetermined time after switch PE opens, thereby allowing pumps 25, 39, 48, 56 and 72 to continue to operate for a predetermined time to prevent crystallization in the lines after shut-down.

After sufficient circulation of the solution from the absorber to the generator and back to the absorber, the temperature of the solution in the absorber will rise to a predetermined temperature, for example, 130° F. At this point the sensing element 90 of the preheat termination control 91 will signal the control 91 to energize the relay coil PT. The normally closed contacts of the relay PT will open to deenergize the solenoid air valve coil SAV1 and the relay coil CR.

Thus upon sensing a predetermined temperature of the absorption solution, the preoperational preheat cycle is terminated. Deenergization of valve 100 will allow the steam valve 90 to close by bleeding air through port NO into the capacity tank 92 and out normally open port NO of solenoid air valve 101. When the normally closed contacts PT are opened by controller 91 through coil PT, the relay coil CR is deenergized. Thus the normally closed contacts CR will again close energizing the chilled water pump starter coil MS2. Chilled water pump 39 will go into operation when contacts MS2 are closed. In addition, normally open relay contacts MS2' will close thus completing a circuit to the pressure electric switch PE.

Since it has been assumed that the thermostat 84 is calling for more steam, switch PE will be closed, thus feeding power to relays MS3 and MS4 to start cooling water pump 25 and cooling tower fan 47. At the same time power will be fed to coil SAV2 to energize the relay contacts of the second solenoid air valve 101. When air valve 101 is energized, the normally closed line NC will communicate with the common line which in turn communicates with capacity tank 92. The normally open line NO will close. A restrictor 93 is placed in the line between the normally closed port of the second solenoid air valve and a supply line 94. Thus whenever the thermostat 84 calls for refrigeration, i.e., increased steam input to heat exchanger 34, the restrictor will allow only a gradual pressure buildup at the pilot port 95 of the cumulator 83. This mechanism is an operation demand limiter which prevents the valve 90 from opening wide too quickly. Of course, when the thermostat 84 signals that less or no steam is needed responsive to a decreased refrigeration demand, the pressure electric switch PE will open to deenergize the second solenoid air valve, the cooling water pump 25 and the cooling tower fan 47.

It is understood that the control scheme disclosed above can be used with or without the operational demand limiting device. The above disclosure is only the preferred embodiment of the subject invention.

The control system of the instant invention provides three distinct advantages for cold starting an absorption refrigeration machine. First, the steam admitted to the generator can be metered to exactly match the safe output of the boiler; secondly, the preheat cycle allows the boiler to fully fire up for regular start of the unit; and thirdly, the preheat cycle will decrystallize any partially crystallized absorption solution which is present prior to startup. In addition this invention will allow a fast and efficient initial start of an absorption machine because the pump circulating cooling fluid to the absorber and condenser is not activated during the preoperational cycle.

I claim:

1. A method for cold starting an absorption refrigeration machine, said machine including an absorber, an evaporator, a generator, a condenser, a refrigerant, an absorption solution, and means placing the generator and the absorber in fluid communication, the method comprising:
    a. initially supplying a heating fluid to the generator at a predetermined substantially constant rate to heat the machine,
    b. intermittently circulating absorption solution between the generator and the absorber until said absorption solution reaches a predetermined temperature.

2. The method of claim 1 wherein said predetermined substantially constant rate is substantially the same as the maximum output rate of the source of said heated fluid.

3. The method of claim 1 wherein said predetermined temperature is below the normal operating temperature of said absorber.

4. In an absorption refrigeration machine including:

a. an absorber having an heat exchanger means therein for cooling absorption solution;
b. an evaporator in fluid communication with said absorber having an heat exchange means therein for chilling a heat transfer fluid;
c. a condenser having an heat exchange means therein for condensing refrigerant;
d. a generator having an heat exchange means for supplying heat to an absorption solution therein;
e. means for circulating absorption solution from said absorber to said generator and from said generator to said absorber, an improvement in controlling said absorption refrigeration machine comprising:
f. a control means capable of providing a control signal responsive to:
 i. a first condition initiating a preoperational cycle of said machine,
 ii. a second condition indicating completion of said preoperational cycle,
 iii. a third condition derived from the demand for refrigeration on said machine,
g. a heat control means for varying the heat supply to said heat exchange means in said generator, said heat control means responsive to said control signal, said first condition relating a predetermined rate of flow of heat through said heat control means during said preoperational cycle, said second condition causing said third condition to override said first condition, thereafter said third condition functionally relating the said heat supply to the said demand.

5. The machine of claim 4 wherein said predetermined rate of flow is substantially constant.

6. The machine of claim 5 wherein said predetermined rate is substantially equal to the maximum rate of supply of which the heat supply source is capable.

7. The machine of claim 4 wherein said second condition is the temperature of absorption solution in said machine.

8. The machine of claim 7 wherein said second condition is the temperature of absorption solution in said absorber.

9. The machine of claim 4 wherein said means for circulating absorption solution is responsive to said control signal upon occurrence of said first condition.

10. The machine of claim 9 wherein said means for circulating absorption solution intermittently circulates absorption solution.

11. The machine of claim 5 wherein said first condition is manually actuated to initiate said preoperational cycle.

12. The machine of claim 4 wherein said third condition is the temperature of the said chilled heat transfer fluid leaving the said heat exchange means in the said evaporator.

13. The method according to claim 1 wherein heating fluid is supplied to the generator at a variable rate after said absorption solution reaches said predetermined temperature, said variable rate being responsive to refrigeration demand on the machine.